US008144892B2

(12) United States Patent
Shemesh et al.

(10) Patent No.: US 8,144,892 B2

(45) Date of Patent: Mar. 27, 2012

(54) AUDIO AMPLIFICATION SYSTEM

(75) Inventors: Ilan Shemesh, Newton, PA (US); Ido Roseman, Givataim (IS)

(73) Assignee: The Sapling Company, Inc. of Huntingdon Valley, PA., Huntingdon Valley, PA (US)

( * ) Notice: Subject to any disclaimer, the term of this patent is extended or adjusted under 35 U.S.C. 154(b) by 1133 days.

(21) Appl. No.: 11/958,840

(22) Filed: Dec. 18, 2007

(65) Prior Publication Data

US 2008/0144844 A1 Jun. 19, 2008

Related U.S. Application Data

(60) Provisional application No. 60/875,769, filed on Dec. 18, 2006.

(51) Int. Cl.
*H04B 3/00* (2006.01)

(52) U.S. Cl. ................ 381/77; 381/59; 381/79; 381/95; 381/111; 381/120; 381/122; 381/311; 381/363

(58) Field of Classification Search .................... 381/77, 381/79, 59, 91, 95, 96, 111, 113, 116, 120, 381/122, 311, 356, 363
See application file for complete search history.

(56) References Cited

U.S. PATENT DOCUMENTS

| | | | | |
|---|---|---|---|---|
| 5,818,328 | A * | 10/1998 | Anderson et al. | 340/384.72 |
| 6,219,645 | B1 * | 4/2001 | Byers | 704/275 |
| 6,256,554 | B1 * | 7/2001 | DiLorenzo | 700/236 |
| 6,560,469 | B1 * | 5/2003 | Kim et al. | 455/569.1 |
| 6,606,280 | B1 * | 8/2003 | Knittel | 367/198 |
| 6,741,708 | B1 * | 5/2004 | Nakatsugawa | 381/79 |
| 6,810,125 | B2 * | 10/2004 | Oster et al. | 381/111 |
| 7,551,894 | B2 * | 6/2009 | Gerber et al. | 455/41.2 |
| 2003/0118204 | A1 * | 6/2003 | Kawasaki et al. | 381/355 |
| 2003/0147540 | A1 * | 8/2003 | Oster et al. | 381/111 |
| 2004/0131201 | A1 * | 7/2004 | Hundal et al. | 381/77 |
| 2006/0153400 | A1 * | 7/2006 | Fujita et al. | 381/95 |
| 2006/0198539 | A1 * | 9/2006 | Kung | 381/113 |

* cited by examiner

*Primary Examiner* — Andy Huynh
(74) *Attorney, Agent, or Firm* — Lucas & Mercanti, LLP; Peter J. Phillips

(57) ABSTRACT

A wireless audio amplification system for classrooms and the like includes a system that allows for advanced listening and learning audio tools. The invention combines radio frequency and infrared technologies into one integrated system. A microphone includes a radio frequency receiver and an infrared transceiver. The microphone transmits voice signals to an audio amplifier unit that includes a radio frequency transceiver and an infrared transceiver.

20 Claims, 7 Drawing Sheets

AUDIO AMPLIFICATION SYSTEM

CROSS-REFERENCE TO RELATED APPLICATIONS

This application is entitled to the benefit of U.S. provisional patent application No. 60/875,769, filed Dec. 18, 2006. Such application is incorporated herein by reference.

STATEMENT REGARDING FEDERALLY-SPONSORED RESEARCH OR DEVELOPMENT

Not applicable.

FIELD OF THE INVENTION

The present invention relates to an audio amplification system particularly suitable for use in classrooms and the like.

BACKGROUND OF THE INVENTION

In large rooms such as school classrooms, lecture halls, auditoriums, theaters and the like, there is often a need for audio amplification of a speaker's remarks. Not only do individuals in the back rows of seats need to hear the speaker clearly, but these audio amplification systems can also be used for other purposes. For example, in today's classrooms many audio systems are used in order to enhance each student's learning experience, including: paging, audio enhancement for television, overhead projectors, and microphone systems for teachers. These audio systems are frequently wireless. This type of system gives the speaker great freedom to walk about the room or stage to work on a blackboard, operate audio-visual equipment and the like. The microphone transmits a wireless signal to a receiver/audio amplifier unit located within the room, and the amplifier sends an amplified signal (usually by wire) to speakers mounted within the room, typically near the back.

Currently, there are two main types of technologies available for wireless audio amplification systems: FM Radio Frequency (RF) systems, and Infrared (IR) systems. Both systems have advantages and disadvantages as described below:

Radio Frequency (RF)

A typical prior art "pure" RF system is shown in FIG. 1. As used herein, "pure" means that only one signal transmission mode is used, in this case RF. In FIG. 1, a teacher in a classroom carries or wears a microphone 102 that broadcasts the teacher's voice by RF signals. The signals can propagate throughout the room, through objects in the room such as blackboards 104, and even beyond the room. The signals are picked up by an RF receiver 108 mounted somewhere in the room, amplified and then sent to wired speakers 110, 112. Outside light, such as from windows 106, does not interfere with signal transmission. Since the signals can penetrate the walls of the classroom, if the teacher leaves the classroom and forgets to turn off the microphone, the teacher's voice will still be heard by students in the room.

Some typical advantages of a "pure" RF system include: (1) The RF signal is normally able to be received from anywhere in the room. (2) The RF signal does not require line of sight contact between transmitter and receiver. Thus, for example, a teacher could walk behind a blackboard and still be heard by the students. (3) Signal strength is usually strong and can be transmitted/received through walls, up to a determined area. (4) Only one receiver is needed because of the signal strength and the ability of the RF signal to bounce/reflect off some objects. (5) The receiver can be placed in any area of the room, and does not need to be in a specified place.

Disadvantages of a "pure" prior art RF system include: (1) An RF Microphone is limited to the number of channels (frequencies) that can be selected. (2) A different channel must be used for each room, and the user must manually set the channel on the microphone to match the receiver's channel in each particular room. (3) The RF signal does not stop at the classroom walls. Thus, the signal can often be inappropriately received in other classrooms or when the teacher leaves the classroom. For example, if the teacher leaves the classroom, does not turn off the microphone and is speaking, the signal is still being received inside the classroom that is set to the same frequency, and the audio voice is being transmitted through the speakers. This becomes a problem when the teacher is speaking and does not want the students in the class to hear his or her ongoing conversation outside the classroom. (4) There must be some synchronization between the microphone and the receiver. (5) Radio interference is often a problem. (6) Students are sometimes able to change the channel without the knowledge or permission of the teacher.

Infrared (IR)

A typical prior art "pure" IR system is shown in FIG. 2. The only signal transmission mode used in this case is IR. A teacher 100 in a classroom carries or wears a microphone 102 that broadcasts the teacher's voice by IR signals. The signals can generally propagate throughout the room, but only by line of sight. They cannot propagate through objects in the room such as blackboards 104, or beyond the room. The signals are picked up by one or more IR receivers 120, 130, 140 mounted within the room, amplified and then sent to wired speakers 110, 112. For large rooms, or if there is bright ambient light, such as near windows 106, then more than one IR receiver may be needed. If ambient light is extremely bright, such as from direct sunlight, then the IR signal could be completely interrupted.

Infrared systems have some advantages. Since IR light cannot go through walls, a facility can install and use the same type of system in multiple rooms without causing interference. Also, when a teacher leaves the receiver's area (such as a classroom), the teacher's microphone will automatically shut down because interrupting the direct line of sight between transmitter and receiver will cause signal contact to be lost. In this way, the teacher does not need to be concerned about making inappropriate remarks outside the classroom that could be heard by students in the classroom.

Disadvantages of a "pure" prior art IR system include: (1) Line of sight contact is required between the transmitter and receiver. Therefore, for example, the receiver must be installed in the ceiling or high on the wall and cannot be covered or obstructed. (2) Even though an IR signal can be reflected off walls, the signal strength may be weak or choppy in areas near windows where there is much light, and in areas behind or near a blackboard which can absorb the light. (3) Since IR light cannot penetrate walls, a classroom with an "L" shape or other unusual shape, or a classroom that has interior partitions, needs multiple receivers that usually must be installed into the ceiling, which can be time-consuming and expensive. (4) Usually the receiver's control panel must be placed in an accessible area, and not mounted in the ceiling with the receiver. (5) IR systems typically require a fair amount of power to transmit the IR signal. Thus, for example, a portable microphone with an IR transmitter needs a large battery, or a number of small batteries, that must be replaced frequently.

Because of the above-mentioned disadvantages of prior art "pure" RF and "pure" IR audio systems, a need exists for a wireless audio amplification system that maximizes the advantages and minimizes the disadvantages of RF and IR systems.

SUMMARY OF THE INVENTION

To meet the aforementioned need, a wireless audio amplification system for classrooms and the like has been developed that combines the advantages of both RF and IR technologies, and minimizes the disadvantages of each.

In one embodiment, the invention comprises an audio amplification system that includes:

(a) an audio amplifier including a microprocessor, a radio frequency transceiver, an infrared transceiver, an antenna, amplification electronics and at least one speaker;

(b) a wireless microphone including a microphone head, a radio frequency transceiver, an infrared receiver, a microprocessor and an antenna; whereby (c) the audio amplifier is configured to transmit infrared signals to the microphone containing a channel code representative of a particular transmission channel, and the microphone unit is arranged to transmit radio frequency signals representative of audio signals to the audio amplifier over the particular transmission channel.

BRIEF DESCRIPTION OF THE DRAWINGS

These and other features and advantages of the invention will now be described with reference to the drawings of certain preferred embodiments, which are intended to illustrate and not to limit the invention, and in which like reference numbers represent corresponding parts throughout, and in which.

DETAILED DESCRIPTION OF THE INVENTION

In a preferred embodiment, the audio system of the present invention includes two major components: (1) an audio amplifier unit 200 (FIG. 4) that includes both an IR transmitter and an RF receiver/transmitter; and (2) a microphone unit 300 (FIG. 3) that is capable of receiving an IR signal and receiving and transmitting an RF signal.

Some advantages of this combined IR/RF system include the following: (1) Because IR light cannot go through walls, a facility can have the same system in multiple rooms without causing interference. (2) Since IR light needs direct point of view contact between transmitter and receiver, the microphone automatically shuts down when that contact is lost for a specified period of time. Thus, when the teacher leaves the receiver's area (classroom), the teacher's voice can no longer be heard. (3) Since the microphone can receive IR signals but only transmits signals in RF, less power is required, namely fewer batteries, at the microphone. (4) The RF signal is normally able to be received from anywhere in the room. (5) The RF signal does not require line of sight contact between transmitter and receiver. Thus, for example, a teacher could walk behind a blackboard and still be heard by the students. (6) Signal strength is usually strong and can be transmitted/received through walls, up to a determined area. (7) Only one receiver is needed because of the signal strength and the ability of the RF signal to bounce/reflect off some objects. (8) The receiver can be placed in any area of the room, and does not need to be in a specified place.

Figure 4:
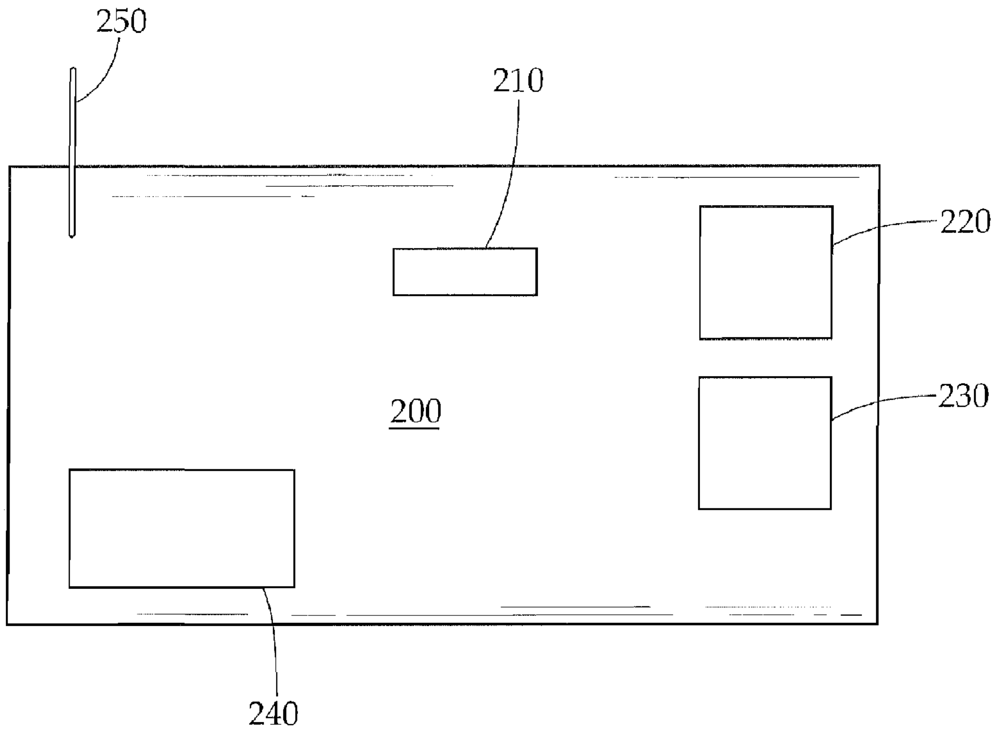
FIG. 4 is a block diagram of an audio amplifier unit used in the wireless audio amplification system of the present invention.

A block diagram of a preferred embodiment of the audio amplifier unit 200 is shown in FIG. 4. The amplifier includes a microprocessor board 210 coupled to an RF transceiver 220, an IR transceiver 230 and an antenna 250. Other conventional audio amplification electronics (not shown) is also contained within the amplifier and coupled to at least one speaker 240. The audio amplifier can be mounted on a ceiling or wall and can be controlled via RF, IR or wired remote control, or it can be used as a desktop unit with knobs and buttons for control. The audio amplifier typically will be powered by wired classroom electricity.

Figure 1:
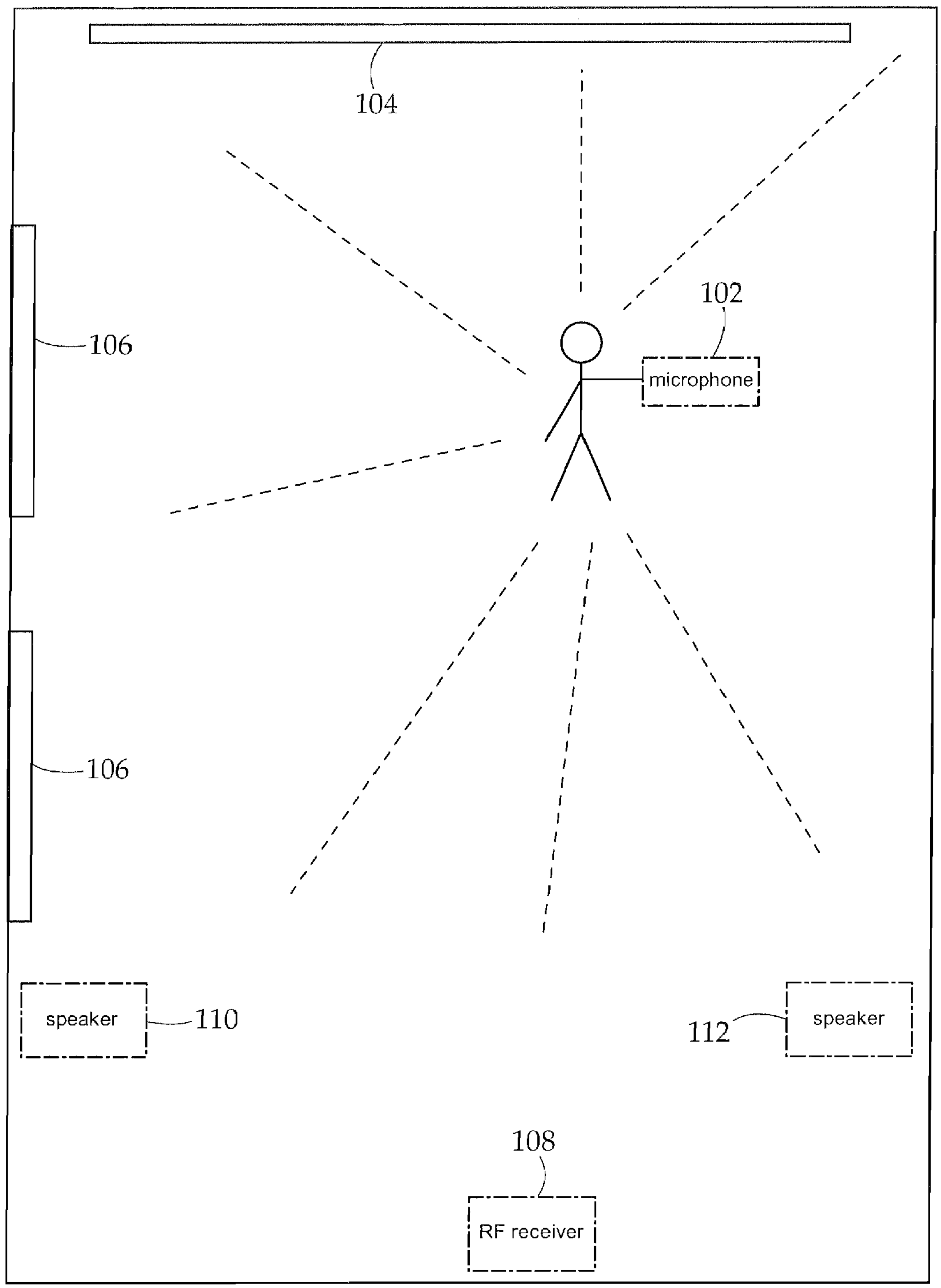
FIG. 1 Prior Art
FIG. 1 is a block/pictorial diagram of a prior art wireless audio amplification system using "pure" RF signal transmission.
Figure 2:
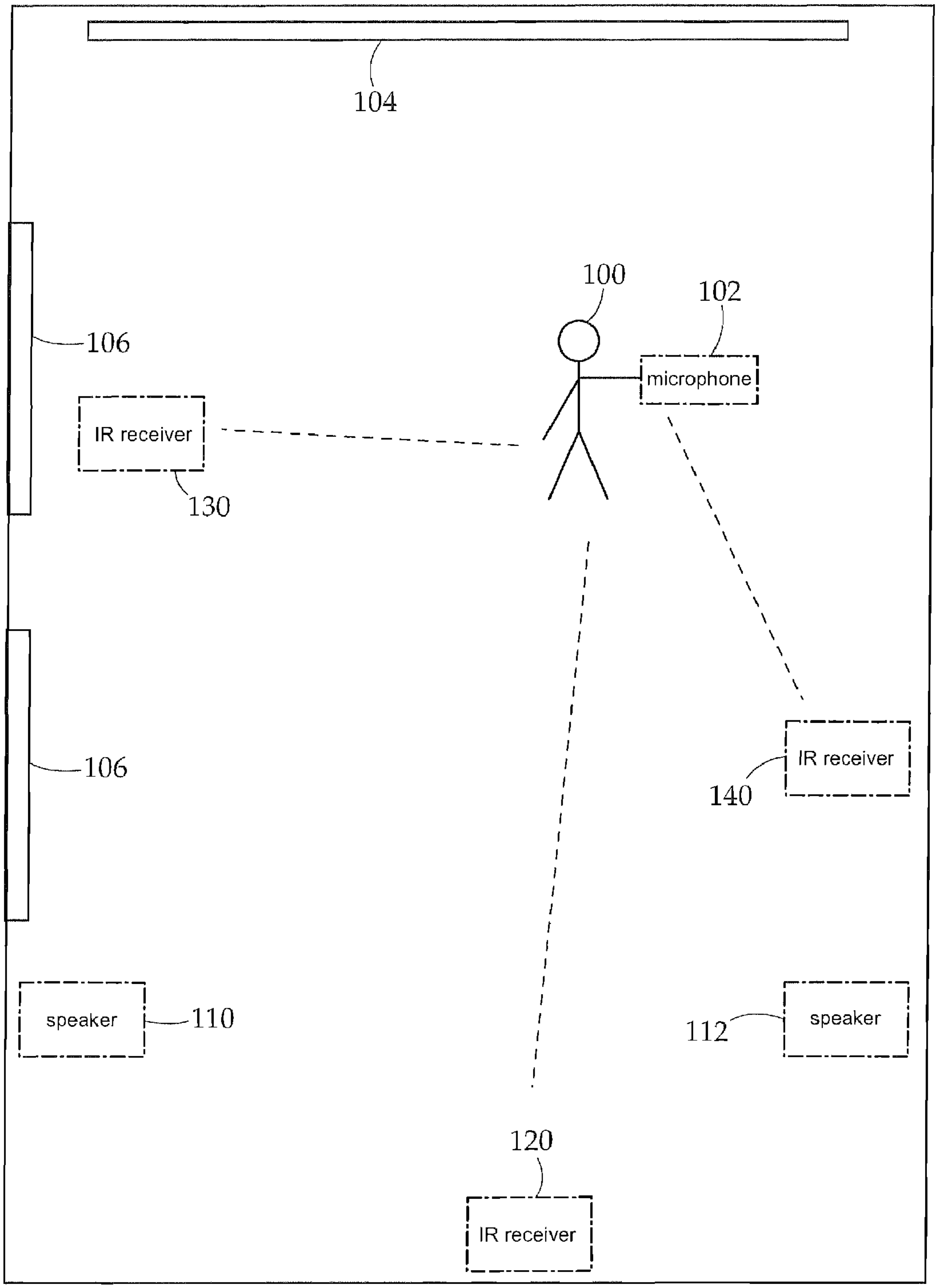
FIG. 2 Prior Art
FIG. 2 is a block/pictorial diagram of a prior art wireless audio amplification system using "pure" IR signal transmission.
Figure 3:
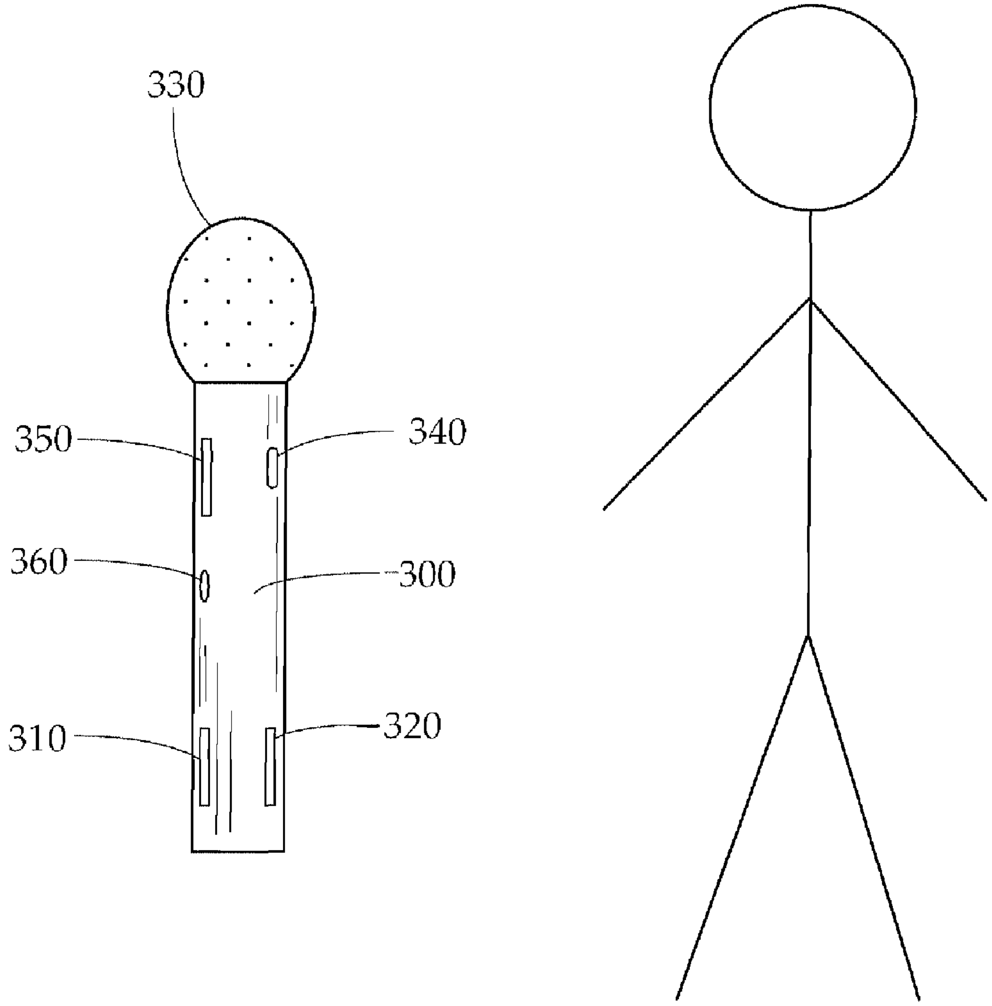
FIG. 3 is a block/pictorial diagram of a wireless microphone unit used in the wireless audio amplification system of the present invention.

A block diagram of the microphone unit 300 is shown in FIG. 3. A microphone head 330 is mounted to a housing containing an RF receiver 310, an RF transmitter (not shown), an IR receiver, a digital signal processor (not shown), a control button 340, a vibrator/buzzer 350 and an auxiliary input 360. The microphone also includes an antenna (not shown) and conventional electronics needed for audio microphone operation.

System Operation

In operation, the audio amplifier 200 (FIG. 4) sends an IR digital signal through the IR transceiver 230 that includes a channel code, channel number or network ID, e.g., channel number 5, representative of a particular transmission channel. Bluetooth, direct-sequence-spread-spectrum or other technologies may be used. The channel number associates itself with the frequency or frequencies that are pre-programmed in the microphone and the audio amplifier.

The microphone 300 (FIG. 3) has an IR receiver 320 that is capable of receiving the appropriate channel number or synchronization code from the IR transceiver 230 and the microphone adjusts its frequency accordingly to match the frequency of the audio amplifier. When the microphone is taken to another classroom, the microphone will receive a different channel number from a different audio amplifier, and will adjust itself accordingly to match the audio amplifier in that classroom. One of the advantages of such a system is that one microphone can be used in any classroom without the need of manual channel selection.

In another embodiment of the invention, the audio amplifier periodically and rapidly sends digital data that includes the channel number, for example 100 messages sent per second. The microphone does not have to receive the signal continually. However, if after a period of time, for example, 5 seconds, the microphone does not receive a channel number, the microphone assumes that the teacher may have left the room. The microphone can provide an audio noise alert, a vibrate alert, or automatically shut off (depending on the preferences of the teacher) to notify the teacher that he or she may still be transmitting an audio signal.

During normal operation, the microphone synchronizes itself to the same frequency as the audio amplifier and transmits an RF signal representing the audio signal from a teacher, student, or any other electronic device that is connected to the microphone via an auxiliary input 360. The RF signal that is sent to the audio amplifier can be in a single frequency, using frequency hopping, spread spectrum, and/or audio compression in order to allow for multiple microphones to operate simultaneously in the same room.

In case of single carrier or frequency hopping operation, the RF transceiver needs to find a clear frequency or hopping pattern that does not disturb other neighboring rooms. This may be accomplished implicitly using a Bluetooth implementation. In this way, the channel number may be transmitted clearly to the microphone or other devices.

Another advantage of such a system is that many classrooms already use a paging/intercom system in existing classes. Because the audio amplifier of the present invention already includes an RF transceiver module 220, the audio amplifier can easily work with existing wireless paging/intercom systems, which can eliminate the need for wired paging and intercom systems in the classroom. Also, in a large classroom, the RF signal can cover and transmit to the entire room without the use of multiple receivers.

Figure 5:
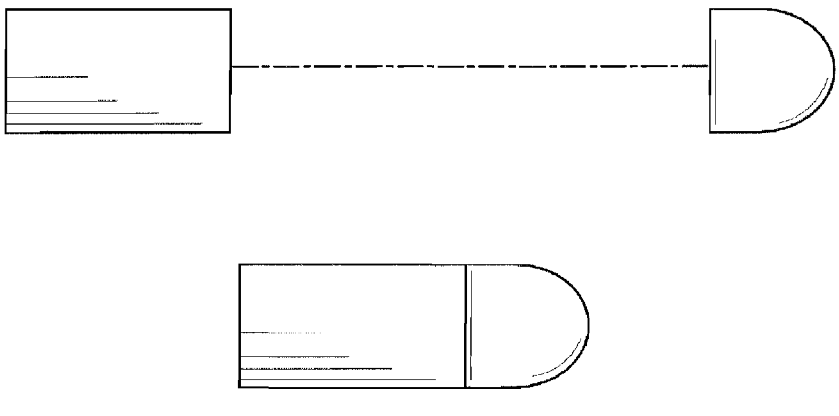
FIG. 5 is a block diagram of an alternative embodiment of the microphone unit of FIG. 3.

In another embodiment, the microphone 330 can be fashioned as a type of gooseneck device. This embodiment is shown in FIG. 5. This device is a long, thin and flexible gooseneck device that has a microphone head on one end coupled to a unit containing an electronic transmitter and other components on the opposite end. The microphone head and transmitter are detachable from the long gooseneck cord and can attach to each other making the device suitable for use as either a handheld, lapel, or pendant unit.

Figure 6:
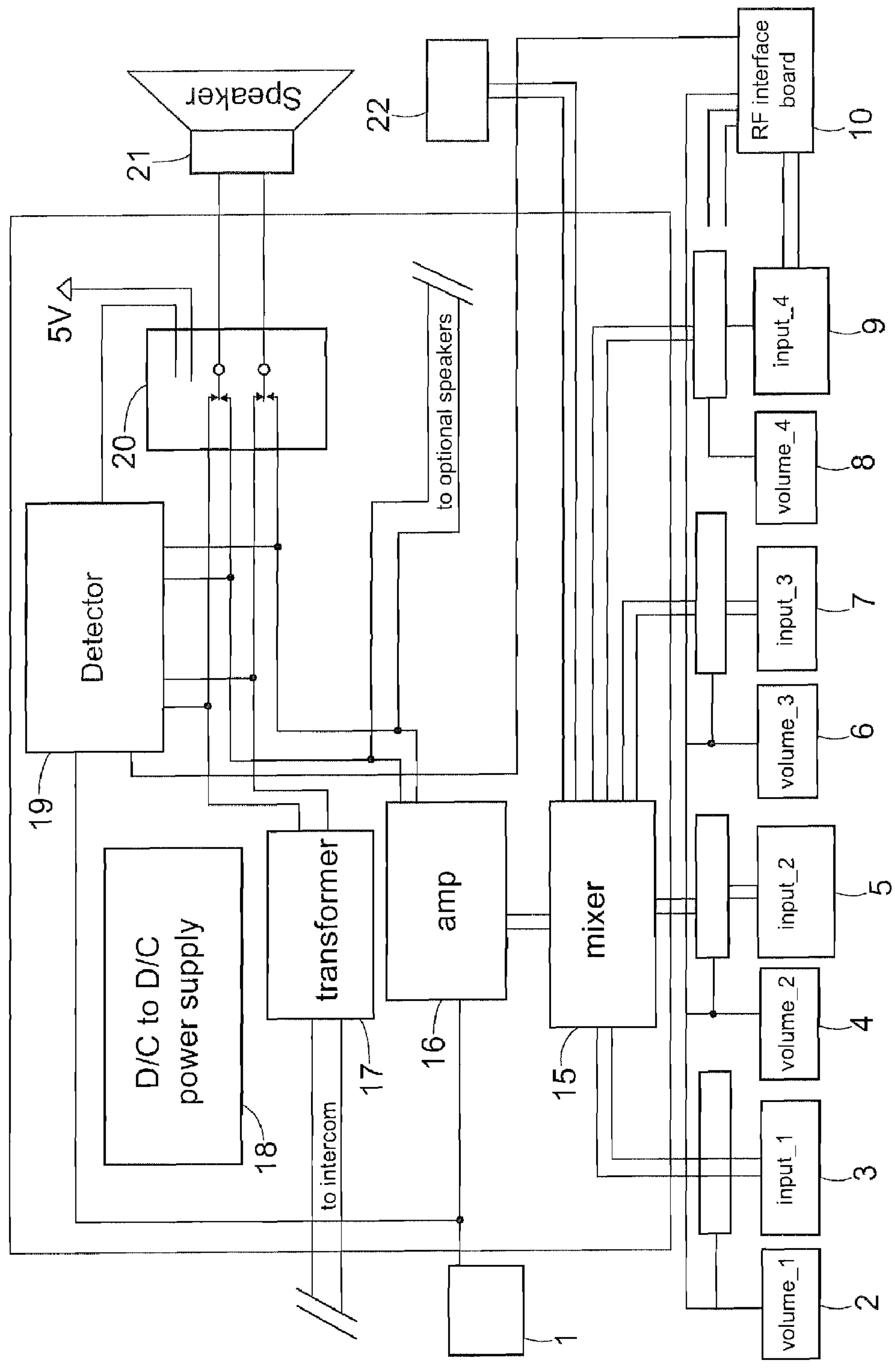
FIG. 6 is a block/schematic diagram showing major electrical components on a microprocessor circuit board for use in the audio amplifier unit of FIG. 4.
Figure 7:
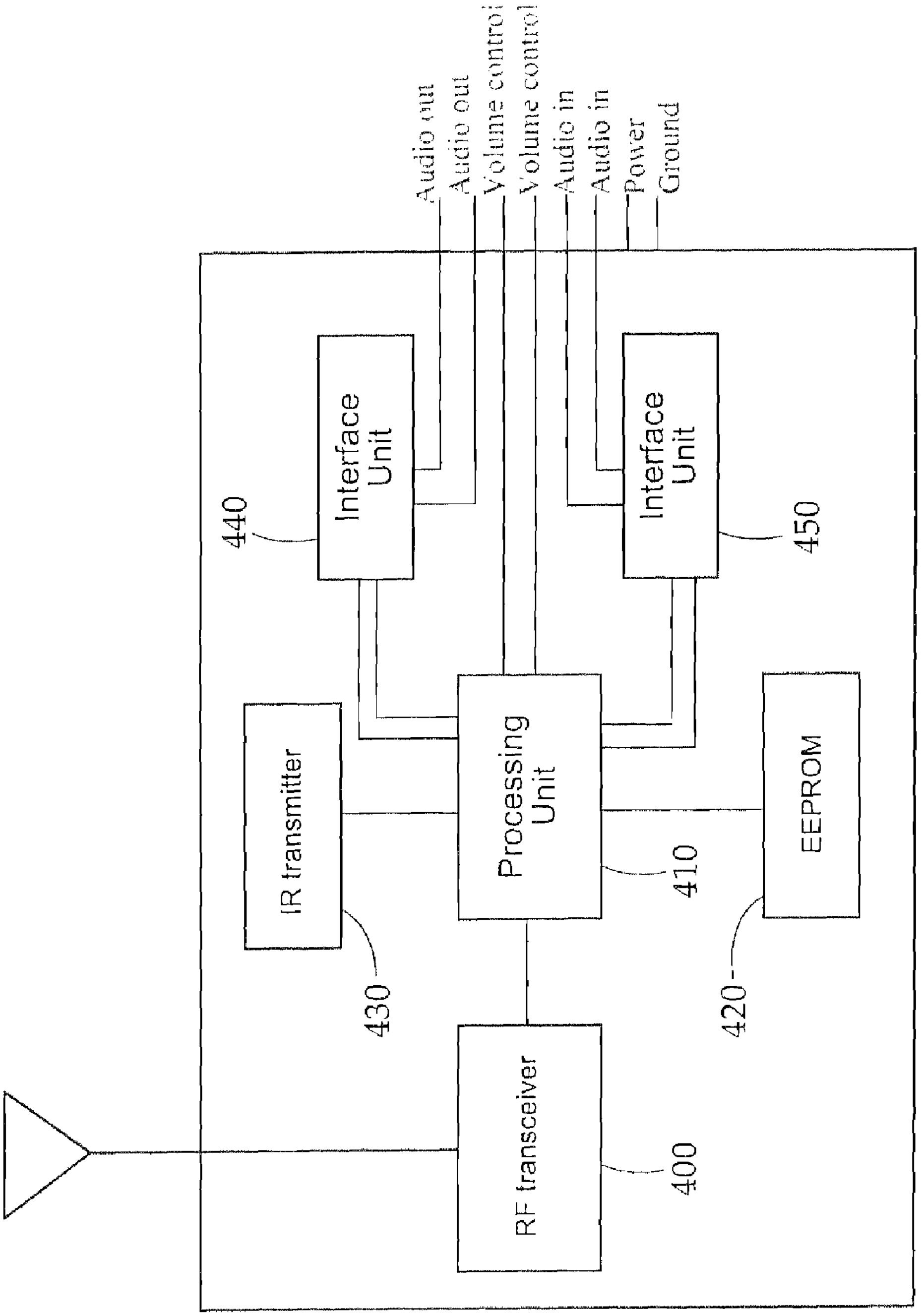
FIG. 7 is a block/schematic diagram showing major electrical components on a microprocessor circuit board for use on the circuit board of FIG. 6.
Figure 8:
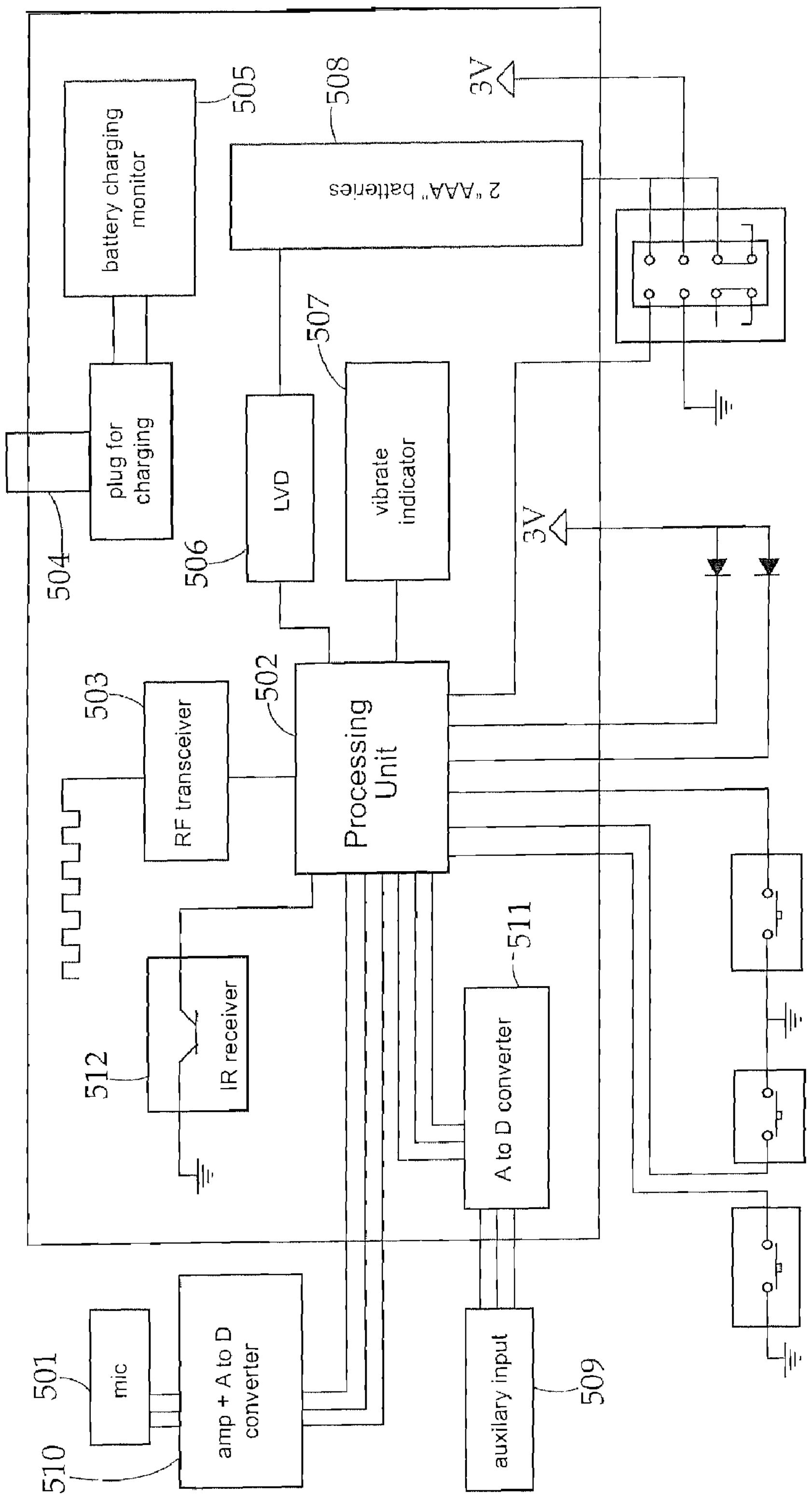
FIG. 8 is a block/schematic diagram showing major electrical components on a microprocessor circuit board for use in the microphone unit of FIG. 3.

A more detailed discussion of the electrical components of a preferred embodiment of the present invention follows. Reference is made to FIGS. 6, 7 and 8.

Audio Amplifier Board (FIG. 6)

The audio amplifier board is the main board of the system, and the last point before the audio signal reaches the speaker (s). This board's detector 19 acts as the tool that notifies the speaker 21 which sounds the students will be hearing, either the intercom paging or auxiliary inputs. The board is powered by a power supply that outputs an appropriate level of power, such as 5v. The audio amplifier board includes the following components:

- Four inputs (elements 3, 5, 7 and 9), each coupled to its own individual volume control (elements 2, 4, 6 and 8, respectively)
- Four pre-amplifiers (11, 12, 13, 14), each coupled to an input (3, 5, 7, 9), respectively.
- A mixer 15 that receives signals from the pre-amplifiers (11, 12, 13, 14) and generates one output to an amplifier 16.
- A master volume control 1 that controls volume for the amplifier 16.
- An RF interface board 10, which is an important component of the system that is coupled to and mounted on the audio amplifier board (see discussion below).
- A detector 19 that is coupled to the amplifier, a transformer 17 and a relay 20. The detector measures signal voltage from the transformer 17 and amplifier 16. Depending on priority, the detector 19 controls relay 20, which controls which device (either an amplifier or the intercom) will gain access to one or more speakers 21. If the detector 19 detects a signal that comes from an external paging or intercom system, the detector, which connects to master volume control 1, will shut off the volume to the amplifier 16 to allow the paging on the intercom to take priority.
- A relay 20 that allows the detector 19 to select which signal will be sent to the speaker 21 (either a signal from transformer 17 or a signal from amplifier 16). Relay 20 gets instructions from detector 19. It acts as the switch to connect either the intercom or amplifier 16 to the speaker 21.
- The speaker 21 outputs sound received from either the Intercom or the microphone audio.
- Line Out 22 allows a connection with another system (another board), and it also connects to the mixer 15.
- Transformer 17 has an Intercom line that comes in to the transformer. It connects to Relay 20.
- A D/C to D/C Power Supply 18 is the power source for the board.

RF Interface Board (FIG. 7)

The RF Interface board is coupled to and preferably mounted on top of the audio amplifier board (FIG. 6). It is connected to the audio amplifier board so that all devices using the RF or IR signals can have access to the speakers controlled by the audio amplifier board. The RF Interface board includes the following components:

RF Transceiver 400

- Receives wireless RF signals and sends them to a processing unit 410. Signals can be received from either a wireless RF microphone head 330 of microphone 300 (see FIG. 3) or from an auxiliary input 360 on the wireless microphone.
- Sends and receives audio signals from an external intercom system (not shown).

IR Transmitter 430

- Transmits IR signals to the IR receiver on the microphone. These signals include but are not limited to channel codes or channel numbers as received from the processing unit 410.

Processing Unit 410

- The main processor of the system that is responsible for selecting the RF channel to perform audio compression and decompression as needed.
- Connected to and controls an interface unit 440 and another interface unit 450 as needed.
- Sends signal to the IR Transmitter
- Can read information from a memory, such as an EEPROM 420, as needed.

Interface Unit 440

- Converts digital signals to analog signals.

Interface Unit 450

- Converts analog signals to digital signals.

EEPROM 420

- Non-volatile memory
- DSP 410 writes data to and receives data from the EEPROM memory Wireless Audio Microphone Board (FIG. 8)

The wireless audio microphone board controls the audio of the microphone 501 (see also FIG. 3). When a teacher, for example, is speaking, the voice is sent through an RF transceiver 503 on the microphone board to the RF transceiver 400 on the RF interface board (FIG. 7) and then to the audio amplifier board (FIG. 6), which transmits the voice through the speakers 240 in the room (FIG. 4). The wireless microphone board also receives room address information from the IR transmitter 430 on the RF interface board (FIG. 7), so that the microphone and the receiver are set to the same channel frequency. The major components of the wireless audio microphone board are as follows:

Microphone 501

Connects to a module 510 containing an amplifier and an A to D converter.

Processing Unit 502

The main processor of the microphone board.

Receives a digital signal representing the voice from the A to D converter module 510.

Receives channel code (channel selection signals) from an IR receiver 512.

Controls the RF transceiver 503 for the information sent and the frequency being used.

Receives digital data from an A to D converter 511 representing a signal received from an auxiliary input 509.

Capable of performing audio compression and decompression as needed.

Can send a control signal to the audio amplifier board (FIG. 6) via RF. The processing unit 502 will receive the control signal via switches SW1, SW2, SW3.

Controls LEDs that represent battery status.

Controls a vibrate/buzzer to give notification to the teacher as needed.

Receives signals from a low voltage detector (LVD) 506 that monitors the status of the battery.

RF Transceiver 503

Wireless signal receiver/transmitter.

Connects to processing unit 502.

Plug for Charging 504

Input for charging the battery from an external power source.

Battery Charging Monitor 505

Monitors and gives enough charge for the battery.

LVD (Low Voltage Detector) 506

Tells processing unit 502 that the battery charge is low.

Vibrate Indicator 507

Informs the user if he or she is out of IR reception range.

One or More Batteries 508

For power.

Connected to battery charging monitor 505.

Auxiliary Input 509

Connects to a mobile device (e.g., DVD, VCR, or MP3 player)

Amplifier +A to D Converter Module 510

Gets input from microphone 501 and converts analog signals to digital audio signals.

Amplifies the audio voice signals.

Connects to processing unit 502.

A to D Converter 511

Gets input from the auxiliary input 509 and converts analog signals to digital signals.

Connects to processing unit 502.

IR Receiver 512

Receives data for channel frequency selection.

Although only one embodiment of the present invention has been expressly disclosed, it is, nonetheless, to be broadly construed, and not to be limited except by the character of the claims appended hereto.

What is claimed is:

1. An audio amplification system comprising:

(a) an audio amplifier including a radio frequency transceiver, an infrared transceiver, and an antenna, (b) a first wireless microphone including a microphone head, a radio frequency transceiver, an infrared receiver, and an antenna; wherein (c) the audio amplifier is configured to transmit first infrared signals to the first wireless microphone containing a first channel code representative of a first particular transmission channel, and the first wireless microphone is arranged to transmit first radio frequency signals representative of audio signals from said first wireless microphone to the audio amplifier over the first particular transmission channel in response to receiving the first infrared signal.

2. The system of claim 1, in which the first channel code is periodically transmitted in a frequency-hopping manner from the audio amplifier to the first wireless microphone.

3. The system of claim 1, in which the first wireless microphone is configured in a gooseneck fashion, such that the microphone head is removable from a microphone portion containing the radio frequency transceiver and the infrared transceiver.

4. The system of claim 1, further including at least a second wireless microphone and wherein the audio amplifier is configured to transmit second infrared signals different from said first infrared signals to the second wireless microphone containing a second channel code representative of a second particular transmission channel, and the second wireless microphone is arranged to transmit second radio frequency signals representative of audio signals from said second wireless microphone to the audio amplifier over the second particular transmission channel.

5. The system of claim 4, wherein the audio amplifier outputs an audio signal from both the first wireless microphone and second wireless microphone simultaneously.

6. The system of claim 5, wherein the audio amplifier includes a switch for selecting a single audio signal from one of the first and second wireless microphones and for outputting the selected audio signal.

7. The system of claim 1, further including a speaker.

8. The system of claim 1, wherein the first radio frequency signal is selected from the group consisting of a single frequency, a frequency-hopping signal, and a spread spectrum signal.

9. The system of claim 1, wherein the first audio signal is a compressed audio signal.

10. The system of claim 1, wherein the first radio frequency signal is arranged in a Bluetooth configuration.

11. The system of claim 1, wherein the first wireless microphone has an alarm indicator which produces an alarm signal in the absence of receiving a first infrared signal in a certain time period.

12. The system of claim 11, wherein the alarm signal comprises at least one of an audio alarm, automatic shut-off; and a vibrating alarm.

13. The system of claim 1, wherein the first wireless microphone includes an auxiliary input for receiving auxiliary audio signals for transmission to the audio amplifier as radio frequency signals.

14. The system of claim 1, wherein the audio amplifier includes an auxiliary input for receiving audio signals from a source other than the first wireless microphone.

15. The system of claim 14, wherein the audio amplifier includes a detector circuit which detects whether an auxiliary input signal is present, and gives audio priority to said auxiliary signal over said first wireless microphone signal.

16. The system of claim 1, wherein the audio amplifier includes a microprocessor.

17. The system of claim 1, wherein the first wireless microphone includes a microprocessor.

18. A method of providing amplified audio signals using a wireless microphone, comprising:

providing an audio amplifier including a radio frequency transceiver, an infrared transceiver, and an antenna;

providing a first wireless microphone including a microphone head, a radio frequency transceiver, an infrared receiver, and an antenna;

transmitting from said audio amplifier to said first wireless microphone a first infrared signal containing a first channel code representative of a first particular transmission channel;

receiving the first infrared signal by the first wireless microphone, and transmitting from the first wireless microphone to the audio amplifier a first radio frequency signal containing audio signals from the first wireless microphone over the first particular transmission channel; and receiving at the audio amplifier the first radio frequency signal and producing an amplified audio signal for output to a speaker.

19. The method of claim 18, including:

providing a second wireless microphone having a microphone head, a radio frequency transceiver, an infrared receiver, and an antenna;

transmitting a second infrared signal, from the audio amplifier to the second wireless microphone, containing a second channel code representative of a second particular transmission channel different from said first particular transmission channel;

receiving the second infrared signal by the second wireless microphone;

transmitting to the audio amplifier a second radio frequency signal containing audio signals from the second microphone over the second particular transmission channel; and receiving at the audio amplifier the second radio frequency signal and producing an amplified audio signal for output to a speaker.

20. An audio amplification system comprising:

(a) an audio amplifier including a microprocessor, a radio frequency transceiver, an infrared transceiver, an antenna, amplification electronics and at least one speaker, (b) a first wireless microphone including a microphone head, a radio frequency transceiver, an infrared receiver, a microprocessor and an antenna;

wherein the audio amplifier is configured to transmit first infrared signals to the first wireless microphone containing a channel code representative of a first particular transmission channel, and the first wireless microphone is arranged to transmit first radio frequency signals representative of audio signals from said first wireless microphone to the audio amplifier over the first particular transmission channel in response to receiving the first infrared signal; and a second wireless microphone, and wherein the audio amplifier is configured to transmit second infrared signals different from said first infrared signals to the second wireless microphone containing a second channel code representative of a second particular transmission channel, and the second wireless microphone is arranged to transmit second radio frequency signals representative of audio signals from said second wireless microphone to the audio amplifier over the second particular transmission channel.

* * * * *